United States Patent [19]

Shuin

[11] 3,844,912
[45] Oct. 29, 1974

[54] PROCESS FOR TREATING ELECTROLYTIC MANGANESE DIOXIDE

[75] Inventor: Masakazu Shuin, Takehara, Japan

[73] Assignee: Mitsui Mining & Smelting Co., Ltd., Chuo-ku, Tokyo, Japan

[22] Filed: July 5, 1973

[21] Appl. No.: 376,452

[52] U.S. Cl. ................................................ 204/96
[51] Int. Cl. ......................................... C01b 13/14
[58] Field of Search ............... 204/96; 136/138, 139

[56] References Cited
UNITED STATES PATENTS 3,455,798   7/1969   Mehne et al. ......................... 204/96

Primary Examiner—R. L. Andrews
Attorney, Agent, or Firm—Armstrong, Nikaido & Wegner

[57] ABSTRACT

Manganese dioxide electrolytically deposited by the electrolysis of an aqueous sulfuric acid solution of manganese sulfate in an electrolyzer having a member of lead is subjected to mutual abrasion and treated with water and/or neutralizing agent, whereby lead and sulfuric ion-containing compounds occluded in the manganese dioxide are reduced sufficiently to be used as a depolarlizer of a dry cell which has a good preservability and is tolerable in a heavy charge.

4 Claims, 3 Drawing Figures

FIG. I
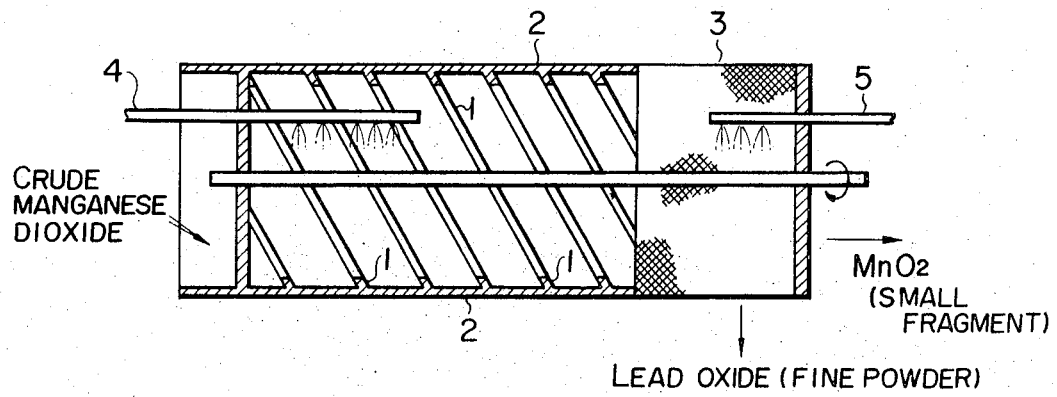

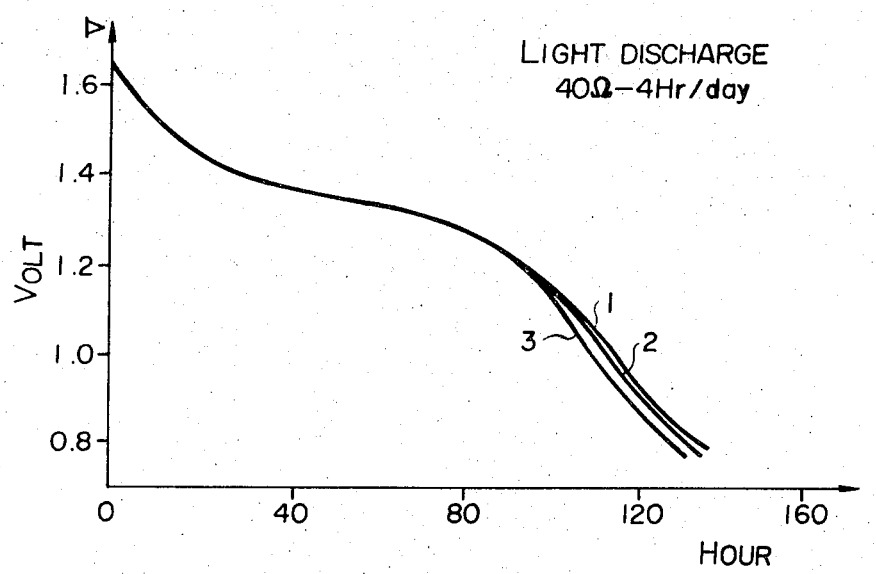
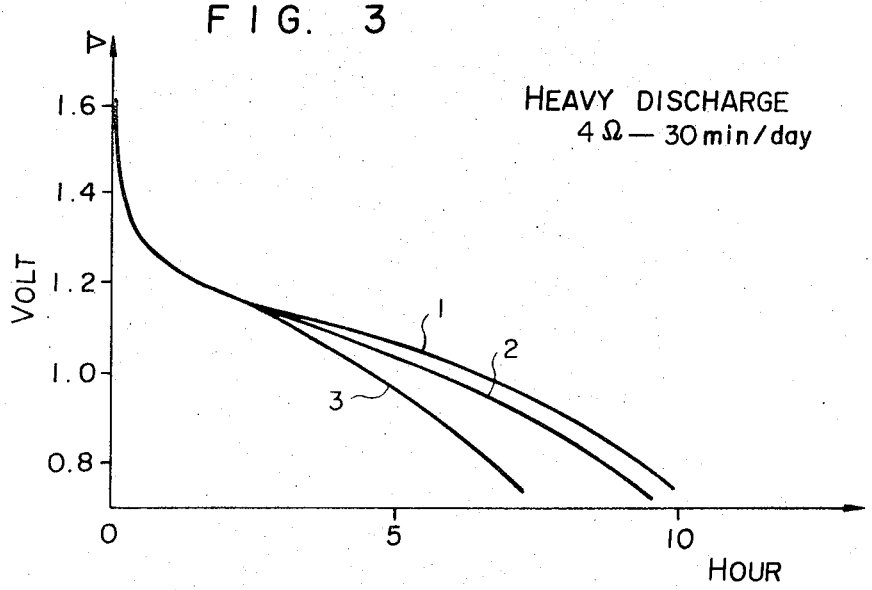

PROCESS FOR TREATING ELECTROLYTIC MANGANESE DIOXIDE

This invention relates to a process for treating manganese dioxide deposited by electrolysis of manganous sulfate. More particularly, the invention pertains to a process for the treatment of electrolytically deposited manganese dioxide for the purpose of providing electrolytic manganese dioxide capable of retaining a sufficient activity as a depolarizer for dry cell.

In the production of electrolytic manganese dioxide commonly practised at present, there is adopted a process in which an aqueous solution comprising manganous sulfate and sulfuric acid is subjected to electrolysis to deposit manganese dioxide on an anode. In that case, the electrodes used include so-called insoluble materials selected from lead, lead alloys, graphite or carbon and titanium. When lead or lead alloy is used as the electrode material, particularly as an anode material in the production of electrolytic manganese dioxide, however, there is such drawback that a lead component such as lead oxide, lead sulfate, metallic lead or the like resulting from the electrodes contaminates the resulting manganese dioxide. When manganese dioxide contaminated with a large amount of lead as such is used as a depolarizes for dry cell, self-discharge of the dry cell is greatly promoted, with the result that the dry cell is deteriorated in the preservability. It is desirable therefore that a lead content of electrolytic manganese dioxide for use in dry cell is 1 percent or less.

In addition to lead the electrolytic manganese dioxide usually contains useless $\beta$-$MnO_2$ resulting from the denature of $\gamma$-$MnO_2$ deposited during the electrolysis, and further may contain carbon which may come from the brittle graphite or carbon anode.

In the case where lead or lead alloy is used as an anode material, the contamination of electrolysis manganese dioxide with lead is mainly ascribable to formation of a film of lead oxide on the anode surface due to the action of oxidation during electrolysis. The film is not compact, but it gradually increases in thickness with the continuation of electrolysis. After completion of the electrolysis, the film of lead oxide is peeled off together with the manganese dioxide layer deposited on the anode surface, because adhesion between said film and the anode substrate metal is insufficient. In the case where such an insoluble material as graphite, carbon, titanium or the like is used as an electrode, the contamination of lead is also ascribable to the fact that by the electrochemical or chemical dissolution action, lead ions or lead compounds dissolved into the electrolytic solution from the lead material in the electrolytic apparatus, for example, a lead or lead alloy cathode and an electrolytic tank lined by lead or lead alloy, are electrically deposited along with manganese dioxide due to the oxidation action of the anode surface.

To reduce a lead content of electrolytic manganese dioxide, there has heretofore been adopted a process in which the electrolytic manganese dioxide is simply washed with water to remove soluble lead compounds therefrom. According to this process, however, it has been difficult to reduce the lead content to the desired level.

When manganese dioxide obtained by electrolysis is used as a depolarizer for dry cell without subjecting to neutralization treatment, there is brought about such a drawback that the cell using such manganese dioxide is markedly deteriorated in its preservability This is ascribable to the fact that at the time of electrolysis, the electrolytic solution comprising manganese sulfate, sulfuric acid and other salts is occluded into the resulting manganese dioxide, i.e. an electrodeposition product, and when such manganese dioxide is used as a depolarizer for dry cell, such acid substances occluded in the manganese dioxide corrode zinc of positive electrode of the cell. For that account, it is necessary to suitably treat the resulting electrolytic manganese dioxide layer after peeling off the same from the electrolytic electrode.

As a procedure to remove such acid substances from the electrolytic manganese dioxide, it is the most common idea to wash said dioxide with large amounts of water. However, since manganese dioxide has a strong adsorption power by itself, it is not possible to remove the acids by means of a mere washing with water to an extent at which the manganese oxide is satisfactorily usable as a depolarizer for dry cell.

In view of the above, there has been proposed a process in which the manganese dioxide is neutralized with an alkaline agent which is harmless to the construction of cell. Usually, a deposited electrolytic manganese dioxide obtained by electrolysis continued for several 10 days has a thickness of 10 — 40 mm, and the deposit peeled off from the electrode contains plate-like masses of 10 — 20 cm in size, and hence such deposite as such is difficult to wash with water or to subject to neutralization treatment. For that reason, there has been proposed a process in which the peeled-off deposit is finely divided, e.g., about 200 mesh, and the finely divided particles are washed or neutralized with water or suitable neutralizer to chemically remove the contaminated soluble impurities, sulfate ion-containing compounds or the like. After drying according to flash drying or the like, the thus obtained electrolytic manganese dioxide is used as an ordinary depolarizer for dry cell.

Such washing and/or neutralization treatment after pulverization of electrolytic manganese dioxide is effective in removing the sulfate ion-containing compounds, but, on the other hand, there is such drawback that the treatment results in deterioration of activity as a depolarizer inherent in electrolytic manganese dioxide, and the dry cell using such manganese dioxide is only usable for light discharge. Furthermore, since the manganese dioxide subjected to such treatment is in the form of finely divided particles, there are such drawbacks that a filtering equipment subsequent to the washing and/or neutralization treatment is required, the recovery of the pulverized manganese dioxide becomes complicate, yield is decreased, and the production cost is increased. In the subsequent drying treatment, moreover, such troublesome consideration as a precise control of the drying apparatus must be taken, because finely divided particles of the electrolytic manganese dioxide are liable to the influence of drying temperature and an error in temperature control results in a further deterioration of the activity of the resulting manganese dioxide.

An object of the present invention is to provide a process for treating electrolytically deposited manganese dioxide for obtaining commercially advantageously manganese dioxide having a sufficient quality as a depolarizer for dry cell.

The other object of the invention is to provide a process for removing not only lead but also β-manganese dioxide and carbon when used as anode from the electrolytically deposited manganese dioxide.

A further object of the invention is to provide a process for removing impurities such as sulfate-ion-containing compounds and the like from the elctrolytically deposited manganese dioxide without deteriorating activity of the product.

These and other objects will be apparent from the following description of the present invention.

FIG. 1 shows a cross sectional view of the apparatus.

FIGS. 2 and 3 show respectively light and heavy discharge characteristics of the cell.

That is, in a process for the production of manganese dioxide in an electrolytic apparatus comprising its members made of lead or lead alloy, said members being in contact with an electrolytic solution, by subjecting an aqueous sulfuric acid solution containing manganous sulfate to electrolysis, the present invention is to provide an improved process for obtaining the electrolytic manganese dioxide, which process comprises a step of subjecting to mutual abrasion the surfaces of the deposited manganese dioxide layers peeled off from an anode, said layers having on their surfaces a lead oxide film, thereby substantially removing said film, and a step of coarsely dividing the manganese dioxide layers from which said films have been removed in the preceding step into particles of 1 – 15 mm in particle diameter, and washing said particles with water and/or neutralizing with an alkali to remove a sulfate ion-containing compound occluded in said particles.

It has been found that distribution of a lead component in the manganese dioxide layer deposited on an anode by electrolysis of an aqueous sulfuric acid solution containing manganous sulfate exponentially decrease in its amount from a layer in contact with the anode surface toward an outer surface in contact with the surface of the electrolytic solution. That is, as shown in Table 1, a lead content of the manganese dioxide layer closely near to a lead oxide film formed between the surface of anode and an electrolytically deposited manganese dioxide layer is very high, but the contamination of the lead component sharply decreases with the continuation of electrolysis, and after the lapse of about 10-day electrolysis, the lead content in the manganese dioxide deposited on the 10th day is reduced to a very low level such as 0.05 percent or less. In the case where graphite is used as a cathode in order to prevent deterioration of the quality of manganese dioxide due to contamination with lead, the electrolytically deposited manganese dioxide obtained after the lapse of about 5-day electrolysis contains lead of 0.06 percent or less, as shown in the said Table. In practice, however, the manganese dioxide layer peeled off from the anode unavoidably contains the lead oxide film, and hence an average lead content of said layer deposited, for example, on the 30th day after the electrolysis increases to 0.7 – 0.5 percent, and the manganese dioxide layer thus obtained is not possible to be used as a depolarizer for dry cell.

Table 1

| Cathode | | Pb-4%Sb | Graphite |
|---|---|---|---|
| | | Lead content (% by wt.) | |
| Lead oxide film | | 50 – 60 | 50 – 60 |
| Electrolytically deposited manganese dioxide | (1st day of electrolysis) | 0.6 | 0.18 |
| do. | (5th day of do.) | 0.10 | 0.06 |
| do. | (10th day of do.) | 0.05 | 0.03 |
| do. | (20th day of do.) | 0.02 | 0.01 |
| do. | (30th day of do.) | 0.02 | 0.01 |
| do. | (40th day of do.) | 0.01 | Below 0.01 |
| Electrolytically deposited manganese dioxide | (50th day of do.) | 0.01 | Below 0.01 |
| do. | (60th day of do.) | 0.01 | Below 0.01 |

Electrolysis conditions: Anode: Pb-4% Sb
Current density: 0.8 A/dm$^2$
Temperature of solution: 90°C
Composition of the electrolyte: Mn++: 25 g/l; H$_2$SO$_4$: 80 g/l In accordance with the present invention, the manganese dioxide layers peeled off from the anode according to ordinary procedure, which layers have respectively lead oxide films on their one surface, are subjected to mutual abrasion of the surfaces having the lead oxide films, whereby the films formed at the initial stage of electrolysis, which film having high contents of lead oxide, liberate in the form of finely divided powder, because said films are more easily rupturable than manganese dioxide. By sieving the liberated powders which are high in lead content, manganese dioxide, whose lead content is markedly reduced, is readily obtained. Illustrating this process more fully, the peeled off manganese dioxide layer is coarsely divided into small pieces having suitable size and, thereafter, the coarsely divided pieces are subjected mutual abrasion. This mutual abrasion is conveniently carried out by means of a wet-type abrasion apparatus as shown in FIG. 1. FIG. 1 shows a cross-sectional view of the apparatus. The apparatus comprises rotary drum 2 having on the inside wall thereof a continuous spiral projection 1, a cylindrical screen 3 connected to one end of the drum, and shower pipes 4 and 5 respectively having a plurality of nozzles at their side wall for spraying water or hot water on the coarsely divided manganese dioxide within the drum 2 and the screen 3, said drum 2 and said screen 3 rotating by means of a motor (not shown). When small pieces of the peeled off manganese dioxide, i.e., the starting material, is fed to the drum 2 and the small pieces are subjected to mutual abrasion by means of rotation of the drum 2, the lead oxide films are preferentially liberated in the form of finely divided powder from the manganese dioxide pieces and simultaneously the starting material are forwarded to the screen 3. The liberated finely divided powders having high lead content are sieved by means of the screen 3 to drop downward, and the manganese dioxide pieces remain on the screen 3. In the above treatment, the present invention may also be practised by use of a so-called dry-type abrasion apparatus which comprises no shower pipes 4 and 5, but by the use of which it takes a slightly long period of time to reduce the lead content to the desired level, i.e., 0.1 percent or less. Naturally, the yield of manganese dioxide having the desired lead content is in proportion to the electrolysis time. In general, the rate of recovery of the peeled off manganese dioxide layer formed after the lapse of a 30- to 45-day electrolysis is about 90 percent. The treatment time varies depending upon the structure of the abrasion apparatus employed, it means the time required for substantially removing the lead oxide film, which time may be determined by experiment. Subsequently, the manganese dioxide from which lead has been removed is dehydrated by means of a drier, if necessary, and is then forwarded to the subsequent step.

That is, the pieces of manganese dioxide freed from the lead are divided into particles of 1 – 15 mm in size, the particles are washed and/or neutralized conveniently in a tank having perforated plate for liquid dispersion at its bottom where said particle are washed with water and/or neutralized with an aqueous alkaline solution, and water for washing or an alkaline solution for neutralization is injected under pressure into said tank through the lower part of the tank to permit said water or said alkaline solution through the manganese dioxide particles packed within said tank. By passing through and/or circulating the said water or alkaline solution, the acid and the like which remains or are occluded in the manganese dioxide particles are leached out or neutralized. The liquid which overflows from the upper end of the tank packed with the manganese dioxide particles are discharged or, if necessary, may be recycled to the beginning of the treatment process. The alkali used for neutralization includes caustic alkali, magnesium oxide, alkali metal carbonates, alkali bicarbonates and the like.

When the above treatment is effected for a given period of time, the electrolytically deposited manganese dioxide comes to give an electrolytic manganese dioxide having excellent properties as a depolarizer for dry cell. An essential feature of the process of the present invention resides in that because the manganese dioxide to be treated is in the form of coarsely divided particles and the particles are brought into contact with a liquid, the present process makes it possible to reduce the loss of manganese dioxide, which occurs when it is in the form of finely divided power which is liable to the collidal state and flows out together with water. Another feature of the present process is that because an electrolytic manganese dioxide is subjected in the form of coarsely divided particles to the washing treatment with water or neutralization treatment, the thus treated manganese dioxide as such may be dried in the subsequent drying treatment by means of a relatively simple drying apparatus such as those of the box-type, tunnel-type or rotating-type without necessitating concentration and filtering step as seen in the prior art drying treatment of manganese dioxide in the form of finely divided powder. According to the present process, the thus treated manganese dioxide particles may be pulverized, after being dried, into finely divided powders which may be used, as they are, as the desired product. In the manner mentioned above, according to the present process it is possible to improve by employing a very simple treatment a rate of recovery of the electrolytic manganese dioxide obtained by the prior art after leaching and neutralization and, at the same time, to obtain by a simple drying treatment the electrolytic manganese dioxide as the product having a stabilized quality. In practicing the treatment according to the present invention, if the particle size of the manganese dioxide particles to be treated exceeds 15 mm, the leaching and/or neutralization treatment is not effected satisfactorily. If the particle size is less than 1 mm, on the other hand, the drawbacks associated with the prior art treatment of finely divided powder is brought about.

To concretely demonstrate the effect obtained according to the process of the present invention, examples are given below to illustrate the invention further in detail.

Example 1—1

In a lead removal step, i.e., the first step, the mutual friction of the manganese dioxide particles was effected with a rotary drum 2 as shown in FIG. 1 having both the diameter and axial directional length of 250 mm by varying the number of revolution from 5 rpm to 60 rpm, i.e., varying the treatment time, while introducing water into the drum through shower pipes 4 and 5. An average lead content in the resulting manganese dioxide and a rate of recovery of said manganese dioxide in each case were as shown in Table 2. It has become clear from this example that after the treatment for 100 minutes and 120 minutes, the average lead content in the fed starting material of 0.74 percent is sharply reduced in both cases to 0.09 percent and 0.05 percent, without considerable reduction in rates of the recovery of the resulting manganese dioxide in both cases, i.e., 90 percent and 88.8 percent, respectively. The starting manganese dioxide used in this example has been obtained by electrolysis under the same conditions as shown in Table 1, using both the anode and cathode of the same material and peeling off the deposited manganese dioxide in an amount of 2.5 Kg after a 30-day electrolysis. Although not shown in Table 2, even when the treatment is effected for a period of time exceeding 120 minutes, no substantial reduction in average content of lead is observed, but only the rate of recovery of the resulting manganese dioxide is reduced. This is considered ascribable to the presence in the resulting manganese dioxide of the lead oxide which has attached thereto in the alloy state.

Table 2

| Treatment time (min.) | Average content of lead in manganese dioxide (% by wt.) | Yield of manganese dioxide (%) |
| --- | --- | --- |
| Stating material | 0.74 | — |
| After treatment for: | | |
| 30 | 0.69 | 99.2 |
| do. 50 | 0.40 | 95.1 |
| do. 80 | 0.19 | 91.9 |
| do. 100 | 0.09 | 90.1 |
| do. 120 | 0.05 | 88.8 |

Example 1-2

Example 1 was repeated, except that the water was not introduced into the rotary drum. The results obtained are shown in Table 3.

Table 3

| Treatment time (min.) | Average content of lead in manganese dioxide (% by wt.) | Yield of manganese dioxide (%) |
| --- | --- | --- |
| Starting material | 0.74 | — |
| After treatment for: | | |
| do. 30 | 0.71 | 99.2 |
| do. 50 | 0.48 | 96.0 |
| do. 80 | 0.25 | 92.2 |
| do. 100 | 0.15 | 91.1 |
| do. 120 | 0.09 | 90.0 |

Example 1–3

Examples 1—1 and 1–2 were repeated in the wet and dry processes, respectively, by feeding the peeled off manganese dioxide obtained after a 45-day electrolysis to the same rotary drum as in Example 1—1. The results obtained in the both cases are shown in Tables 4 and 5, respectively.

Table 4

Results obtained by use of the wet type abrasion apparatus

| Treatment time (min.) | Average content of lead in manganese dioxide (% by wt.) | Yield of manganese dioxide (%) |
| --- | --- | --- |
| Starting material | 0.62 | — |
| After treatment for: | | |
| do. 30 | 0.54 | 99.1 |
| do. 50 | 0.32 | 95.0 |
| do. 80 | 0.16 | 91.7 |
| do. 100 | 0.08 | 90.0 |
| do. 120 | 0.04 | 88.7 |

Table 5

Results obtained by use of the dry type abrasion apparatus

| Treatment time (min.) | Average content of lead in manganese dioxide (% by wt.) | Yield of manganese dioxide (%) |
| --- | --- | --- |
| Starting material | 0.62 | — |
| After treatment for: | | |
| do. 30 | 0.57 | 99.3 |
| do. 50 | 0.36 | 96.1 |
| do. 80 | 0.19 | 92.3 |
| do. 100 | 0.10 | 91.0 |
| do. 120 | 0.07 | 89.9 |

Example 1–4

In this example, an electrolytic manganese dioxide obtained by electrolysis using graphite as a cathode in the electrolytic apparatus was subjected to the treatment by means of the wet-type friction apparatus. The results obtained are shown in Table 6. In obtaining the electrolytic manganese dioxide, the electrolysis was carried out for 30 days with the same electrolysis conditions as in Example 1—1.

Table 6

| Treatment time (min.) | Average content of lead in manganese dioxide (% by wt.) | Yield of manganese dioxide (%) |
| --- | --- | --- |
| Starting material | 0.49 | — |
| After treatment for: | | |
| do. 30 | 0.44 | 99.2 |
| do. 50 | 0.29 | 95.0 |
| do. 80 | 0.14 | 91.8 |
| do. 100 | 0.06 | 90.0 |
| do. 120 | 0.03 | 88.8 |

With the view of comparing the present process for the treatment of an electrolytic manganese dioxide to remove a sulfate ion-containing compound therefrom with the prior art process for the treatment of the same, examples of the present invention and an Experimental Example of said prior art process are given below, and simultaneously a comparison of light and heavy discharge characteristics of dry cells (UM-1) prepared by the manganese dioxide obtained respectively by said examples and said experimental example is also shown.

Example 2–1

The electrolytic manganese dioxide obtained in Example 1—1 was divided into pieces, the pieces were screened by means of a 10-mesh screen and, during the screening, 1.5 Kg of the starting material comprising the pieces having a particle diameter of from about 1 to about 10 mm were fed to a square-type vessel of 100 × 100 × 100 mm having a perforated plate at its bottom portion. Water was passed through the vessel at a flow rate of 30 cc/min. from the bottom to the top. PH value of the overflowing water at the 24th hour was 4.3, and at the 48 hour 6.2, whereby the amounts of sulfate ions in the manganese dioxide were 1.3 percent and 1.04 percent, respectively. After 48 hours, aqueous concentrated ammonia water was passed through the vessel at a flow rate of 30 cc/min. for neutralization, wherby the amount of sulfate ion in the manganese dioxide after the lapse of 24 hours subsequent to the neutralization was found to be 0.85 percent. In that neutralization, the amount of ammonia used was 30 g. The amount of finely divided manganese dioxide accompanied by the overflowing water was found to be less than 1 g.

Example 2—2

The electrolytic manganese dioxide obtained in Example 1-2 was screened by means of a 2 mm mesh screen. During the screening, 1.5 kg of the manganese dioxide composed mainly of particles of 1 – 2 mm in size was fed to the same square vessel as in Example 2-1 and the same amount of water as in Example 2-1 was passed therethrough to measure a pH value of the overflowing water, whereupon the pH measure at the 24th hour was found to be 4.8 and at the 48th hour 6.1, and the amounts of sulfate ions in both cases were found to be 1.30 percent and 1.02 percent, respectively. After 48 hours, ammonia water was passed through the said vessel at a flow rate of 30 cc/min. to effect neutralization, whereby the amount of sulfate ion in the manganese dioxide after the lapse of 24 hours subsequent to the neutralization was found to be 0.82 percent. The amount of ammonia used in this example was also 30 g. The amount of finely divided manganese dioxide accompanied by the overflowing water was found to be 3 g.

Experimental Examples of the prior art process

An electrolytic manganese dioxide peeled off from an electrode was divided into particles. The particles were screened by means of a 100 mesh screen. 1.5 Kilograms of the manganese dioxide particles passed through the screen were washed with water at a flow rate of 30 cc/min. using a thickner test machine of 200 mm in diameter. A pH value of the overflowing water at the 24th hour was found to be 5.8, and at the 48 hour 6.1 and the amounts of sulfate ions in the manganese dioxide in both cases were found to be 1.25 percent and 1.01 percent, respectively. The amount of ammonia used in the above neutralization was 30 g. The amount of finely divided manganese dioxide contained in the overflowing water during the treatment was about 70 g, the finely divided manganese dioxide was recovered by filtering the overflowed water.

As illustrated above, when compared the treatment process of the present invention with the prior art treatment process, the effects of leaching and neutralization treatments of the former are substantially the same as those obtained in the latter. Thus, the drying treatment, according to the present invention, subsequent to the above leaching and neutralization treatments may be effected without employing a complicated equipment and also without necessitating an acurate temperature control, both being required in the prior art process.

Further, dry cells were prepared, according to usual procedure, respectively, by use of the manganese dioxides treated in the foregoing present Examples 2-1 and 2—2, and the manganese dioxide treated in the foregoing Experimental Example of the prior art process. Discharge characteristics as measured by use of each cell with a load of 40Ω for 4 hours a day, i.e., light discharge characteristics, and discharge characteristic as measured by use of said cell with a load of 4Ω for 30 minutes a day, i.e., heavy discharge characteristics, are shown respectively in FIGS. 2 and 3. From these figures, it may be understood that the cells in which the manganese dioxides treated according to the present treatment process were used are excellent as compared with the cell using the manganese dioxide treated according to the prior art treatment process. In FIGS. 2 and 3, numerals 1, 2, and 3 represent the characteristic curves obtained by use of the cells in which the manganese dioxides prepared according to the present Examples 2-1, 2—2, and the aforesaid Experimental Example of the prior art process, respectively.

What is claimed is:

1. In a process for producing manganese dioxide by electrolysis of an aqueous solution containing sulfuric acid and manganous sulfate in an electrolytic apparatus, whose members in contact with the electrolytic solution are made of lead or lead alloy, the improvement comprises a step of subjecting the deposited manganese dioxide layers having lead oxide films on their surfaces peeled off from an anode to mutual abrasion, thereby substantially removing said films from said layers, and a step of coarsely dividing the manganese dioxide layers from which said films have been removed in the preceding step into pieces of 1 to 15 mm in particle diameter, and washing with water or an alkaline solution, thereby removing a sulfate ion-containing compound occluded in said pieces.

2. A process according to claim 1, wherein the mutual abrasion is carried out in the presence of water or hot water.

3. A process according to claim 1, wherein the washing with water is first effected and then the neutralization with alkaline solution is effected.

4. A process according to claim 1, wherein the alkaline solution used in the neutralization is ammonia water.

* * * * *